(12) United States Patent
Kafyeke et al.

(10) Patent No.: US 11,299,255 B2
(45) Date of Patent: Apr. 12, 2022

(54) AIRCRAFT SLAT INCLUDING ANGLED OUTBOARD EDGE

(71) Applicant: BOMBARDIER INC., Dorval (CA)

(72) Inventors: Fassi Kafyeke, Laval (CA); Marc Langlois, Montreal (CA)

(73) Assignee: BOMBARDIER INC., Dorval (CA)

( * ) Notice: Subject to any disclaimer, the term of this patent is extended or adjusted under 35 U.S.C. 154(b) by 367 days.

(21) Appl. No.: 16/468,235

(22) PCT Filed: Nov. 16, 2017

(86) PCT No.: PCT/IB2017/057188
§ 371 (c)(1),
(2) Date: Jun. 10, 2019

(87) PCT Pub. No.: WO2018/109582
PCT Pub. Date: Jun. 21, 2018

(65) Prior Publication Data
US 2020/0070955 A1 Mar. 5, 2020

Related U.S. Application Data

(60) Provisional application No. 62/432,752, filed on Dec. 12, 2016.

(51) Int. Cl.
*B64C 9/24* (2006.01)
*B64C 23/06* (2006.01)

(52) U.S. Cl.
CPC .............. *B64C 9/24* (2013.01); *B64C 23/069* (2017.05)

(58) Field of Classification Search
CPC .. B64C 9/22; B64C 9/24; B64C 23/06; B64C 23/069

(Continued)

(56) References Cited

U.S. PATENT DOCUMENTS

| 4,399,970 A | 8/1983 | Evans |
| 4,671,473 A | 6/1987 | Goodson |

(Continued)

FOREIGN PATENT DOCUMENTS

| CN | 104943852 A | 9/2015 |
| WO | 8204426 A1 | 12/1982 |

(Continued)

OTHER PUBLICATIONS

International Search Report and Written Opinion with regard to PCT/IB2017/057188 dated Jan. 29, 2018.

(Continued)

*Primary Examiner* — Brady W Frazier
*Assistant Examiner* — Madison Elizabeth Dittner
(74) *Attorney, Agent, or Firm* — BCF LLP

(57) ABSTRACT

A slat (50) for an aircraft wing comprises a leading edge (51) defining a leading edge line (61), a trailing edge (52) defining a trailing edge line (62), the leading and trailing edges line defining a slat plane, the chord distance (69) extending normal to the leading edge and measured along the slat plane; an inboard edge extending between the leading and trailing edges; and an outboard edge (56) extending between the leading and trailing edges. The outboard edge comprises a first side portion having a projection on the plane defining a first side line (63), and a second side portion having a projection on the plane defining a second side line (64), the second side line being disposed at a first angle to the first side line and at a second angle to the leading edge line as it extends toward the inboard and trailing edges. A wing assembly and an aircraft including the slat are also disclosed.

21 Claims, 7 Drawing Sheets

(58) Field of Classification Search
USPC .......................................................... 244/214
See application file for complete search history.

(56) References Cited

U.S. PATENT DOCUMENTS

| | | | |
|---|---|---|---|
| 5,039,032 A | 8/1991 | Rudolph | |
| 6,089,502 A | 7/2000 | Herrick et al. | |
| 6,152,404 A | 11/2000 | Flaig et al. | |
| 6,364,254 B1 | 4/2002 | May | |
| 7,357,358 B2 | 4/2008 | Lacy et al. | |
| 7,475,848 B2 | 1/2009 | Morgenstern et al. | |
| 8,118,265 B2* | 2/2012 | Ferrari | B64C 23/06 244/214 |
| 8,353,483 B2 | 1/2013 | Dodd et al. | |
| 8,408,499 B2* | 4/2013 | Cerne | B64C 9/16 244/213 |
| 8,789,798 B2 | 7/2014 | Kafyeke et al. | |
| 9,090,341 B2* | 7/2015 | Edmond | B64C 23/069 |
| 2015/0053825 A1 | 2/2015 | Isotani et al. | |

FOREIGN PATENT DOCUMENTS

| | | |
|---|---|---|
| WO | 2005092703 A1 | 10/2005 |
| WO | 2009101461 A1 | 8/2009 |

OTHER PUBLICATIONS

English Abstract for CN104943852 retrieved on Espacenet on Jun. 10, 2019.

\* cited by examiner

AIRCRAFT SLAT INCLUDING ANGLED OUTBOARD EDGE

CROSS-REFERENCE TO RELATED APPLICATIONS

The present application claims priority to U.S. Provisional Patent Application No. 62/432,752, filed Dec. 12, 2016, entitled, "Aircraft Slat," the entirety of which is incorporated herein by reference.

FIELD OF TECHNOLOGY

The present technology relates to slats located on the leading edge of wings for fixed-wing aircraft. More specifically, the present technology is directed to the particular configuration of the outboard edge of such slats.

BACKGROUND

Fixed-wing aircraft use leading edge slats, small aerodynamic surfaces on the leading edge of a wing, to improve a wing's maximum lift. When deployed the slats allow the wings of the aircraft to operate at a higher angle of attack in relation to surrounding airflow. Slats are generally deployed during take-off and landing and stowed during normal flight to minimize drag.

It is known in the art that winglets can also be included on the outboard ends of the wings of fixed-wing aircraft to provide drag reduction, potentially leading to valuable fuel savings. While increasing the size of winglets generally improves drag reduction, the size can be limited by several factors. One such factor is performance control, as the introduction of larger winglets can introduce pitching and lift control problems. As the winglets get larger, non-linearities can appear in the pitching moment and the lift coefficient, caused in part by flow separation induced by interference of vortices created by the leading edge slats.

Several solutions to the problems induced by increasing winglet size are known in the art. One such solution is to extend the leading edge slat further outboard, although this can be an expensive solution once an aircraft wing design has been frozen. Performance control issues can also be controlled by using fly-by-wire control laws, but this increases complexity of operational control. In some cases, an effective solution may simply be to reduce the size of the winglet until the performance issues are resolved, although benefits in drag reduction from increasing the winglet size would be lost.

Consequently, there is a desire for a configuration for fixed-wing aircraft that allows for increased winglet size while cost-effectively maintaining performance control.

SUMMARY

It is an object of the present technology to ameliorate at least some of the inconveniences present in the prior art.

According to an aspect of the present technology, there is provided a slat for an aircraft wing, comprising a leading edge defining a leading edge line connecting forward-most points of the slat and extending between an inboard end and an outboard end; a trailing edge defining a trailing edge line connecting aft-most points of the slat, extending between the inboard end and the outboard end, and being disposed a chord distance from the leading edge in a hingewise direction, the leading edge line and the trailing edge line defining a slat plane, the chord distance between the leading edge and the trailing edge extending normal to the leading edge, the chord distance being measured along the slat plane; an inboard edge extending from the leading edge to the trailing edge; and an outboard edge extending from the leading edge to the trailing edge, the outboard edge comprising a first side portion extending from the leading edge to an intermediate point between the leading edge and the trailing edge, a projection of the first side portion onto the slat plane defining a first side line, and a second side portion extending from the intermediate point to the trailing edge, a projection of the second side portion onto the slat plane defining a second side line, the second side line being disposed at a first angle to the first side line and at a second angle to the leading edge line, the second side line extending toward the inboard edge as it extends toward the trailing edge.

In some implementations, the first side line is a straight line.

In some implementations, the second side line is a straight line.

In some implementations, the first side line extends for 90% or less of the chord distance.

In some implementations, the first side line extends for at least 40% of the chord distance. In some implementations, the first side line extends between 50% and 70% of the chord distance.

In some implementations, the first side line is perpendicular to the leading edge line and the first angle and the second angle are complementary angles.

In some implementations, the second angle is at least 45 degrees.

In some implementations, the second angle is less than 45 degrees.

In some implementations, the first side line extends for 60% or less of the chord distance.

In some implementations, the first side line is parallel to a line extending normal to the leading edge.

In some implementations, a projection of the inboard edge onto the slat plane is parallel to the line extending normal to the leading edge.

In some implementations, the slat is an outboard-most slat of the aircraft wing.

In some implementations, the first side portion and the second side portion of the outboard edge provide at least one of a lift coefficient $C_L$ and a pitch moment coefficient $C_M$ that change with respect to the angle of attack of the aircraft.

According to another aspect of the present technology, there is provided a wing assembly comprising a wing body; a winglet connected to a tip of the wing body; and a slat movably connected to the wing body, the slat comprising a leading edge defining a leading edge line connecting forward-most points of the slat and extending between an inboard end and an outboard end; a trailing edge defining a trailing edge line connecting aft-most points of the slat, extending between the inboard end and the outboard end, and being disposed a chord distance from the leading edge in a hingewise direction, the leading edge line and the trailing edge line defining a slat plane, the chord distance between the leading edge and the trailing edge extending normal to the leading edge, the chord distance being measured along the slat plane; an inboard edge extending from the leading edge to the trailing edge; and an outboard edge extending from the leading edge to the trailing edge, the outboard edge comprising a first side portion extending from the leading edge to an intermediate point between the leading edge and the trailing edge, a projection of the first side portion onto the slat plane defining a first side line, and a second side portion extending from the intermediate point to the trailing edge, a projection of the second side portion onto the slat plane defining a second side line, the second side line being disposed at a first angle to the first side line and at a second angle to the leading edge line, the second side line extending toward the inboard edge as it extends toward the trailing edge.

In some implementations, the first side line is a straight line.

In some implementations, the second side line is a straight line.

In some implementations, the first side line extends for 90% or less of the chord distance.

In some implementations, the first side line extends for at least 40% of the chord distance. In some implementations, the first side line extends between 50% and 70% of the chord distance.

In some implementations, the first side line extends for 60% or less of the chord distance.

In some implementations, the first side line is perpendicular to the leading edge line and the first angle and the second angle are complementary angles.

In some implementations, the second angle is at least 45 degrees.

In some implementations, the second angle is less than 45 degrees.

In some implementations, the first side line is parallel to a line extending normal to the leading edge.

In some implementations, a projection of the inboard edge onto the slat plane is parallel to the line extending normal to the leading edge.

In some implementations, when the wing assembly is connected to an airplane, a slat vortex created by air flowing over the outboard edge of the slat is directed toward an inboard side of the wing assembly.

According to another aspect of the present technology, there is provided an airplane comprising a fuselage; and two oppositely disposed wing assemblies, according to any of the implementations above, connected to the fuselage.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description and the accompanying drawings.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
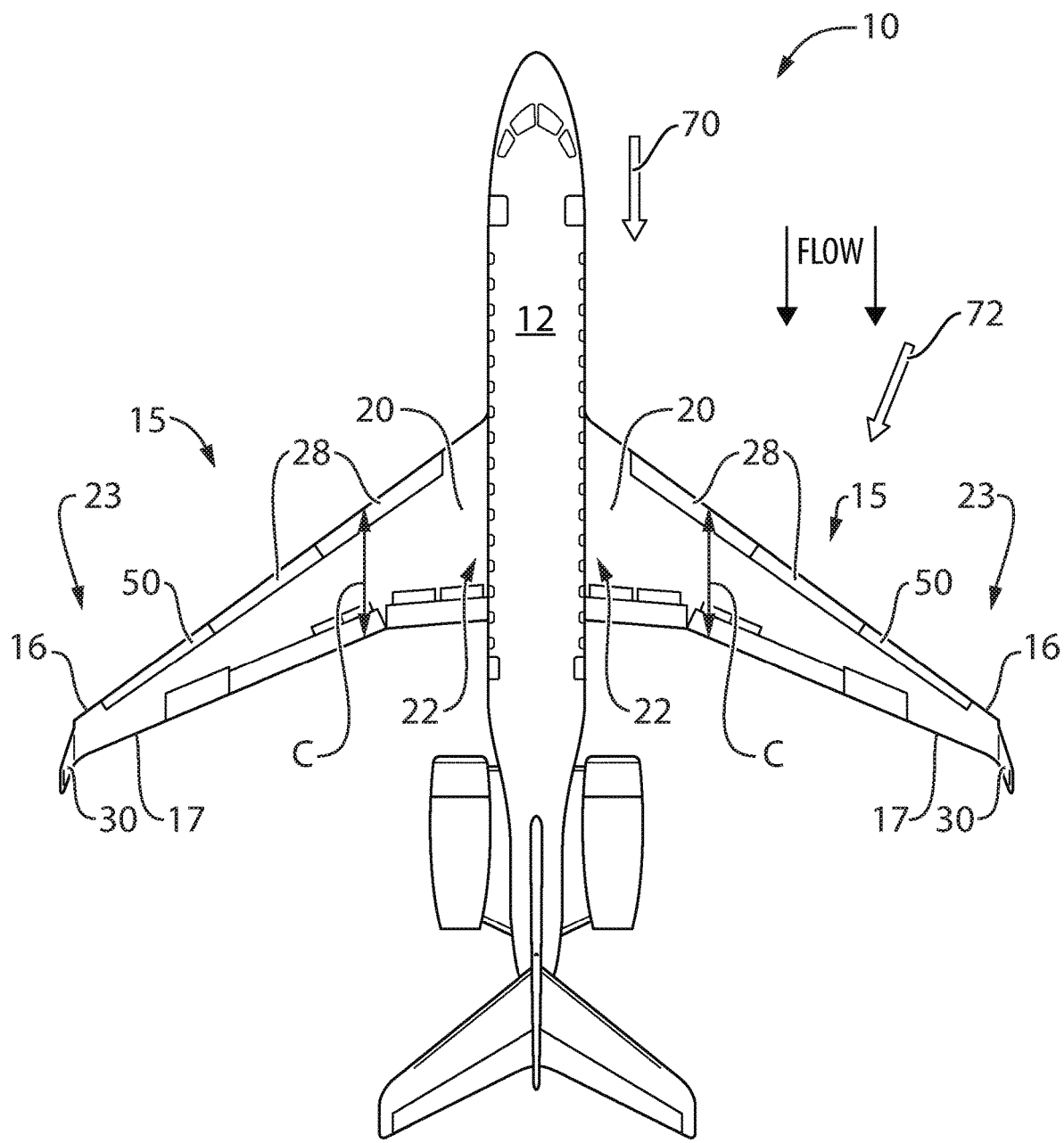
FIG. 1 is a top plan view of an aircraft.

FIG. 1 shows a top view of a fixed-wing jet aircraft 10 according to the present technology. The aircraft 10 includes a fuselage 12 (the body of the aircraft 10). Connected to the fuselage 12 are two oppositely disposed wing assemblies 15, also referred to herein as wings 15. The wings 15 produce lift and therefore flight of the aircraft 10 during operation.

Each wing 15 includes a wing body 20 that extends from a wing root end 22 to an outboard end 23. Each wing 15 includes a leading edge 16 and a trailing edge 17. The size of the wing 15, from the leading edge 16 to the trailing edge 17, is determined using a mean aerodynamic chord ("MAC"), represented by a chord "C", measured in a direction of normal airflow 70. Those skilled in the art will understand that since most wings change their chord over their width (as is the case for the wings 15 illustrated in FIG. 1), the mean aerodynamic chord MAC") is used to compare different wing configurations. In general, more lift is generated on the wider inner sections of the wing 15 as compared to the narrow outer sections of the wing 15. Those skilled in the art will also understand that each wing 15 includes a particular airfoil, or shape, of the wing 15.

Each wing 15 includes a winglet 30 extending at least partially upward from the outboard end 23 of the wing body 20. The winglets 30 are included on the wings 15 of the aircraft 10 to provide drag reduction, with larger winglets 30 providing greater drag reduction.

It is generally known to include at least one slat on each wing to improve the wing's maximum lift during take-off and landing. In the prior art, illustrated in FIG. 2 as a right slat 150, the slats 150 have an outboard end portion 156 which is generally rectangular when viewed from above.

Figure 3:
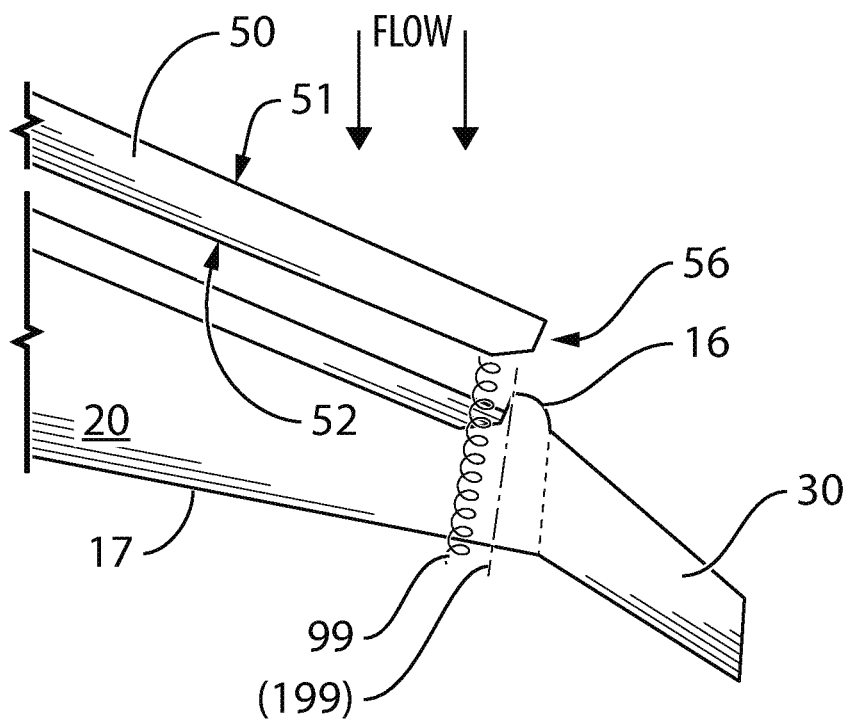
FIG. 3 is a top plan view of an outboard portion of a right wing assembly of the aircraft of FIG. 1, with the slat in a deployed position.
Figure 4:
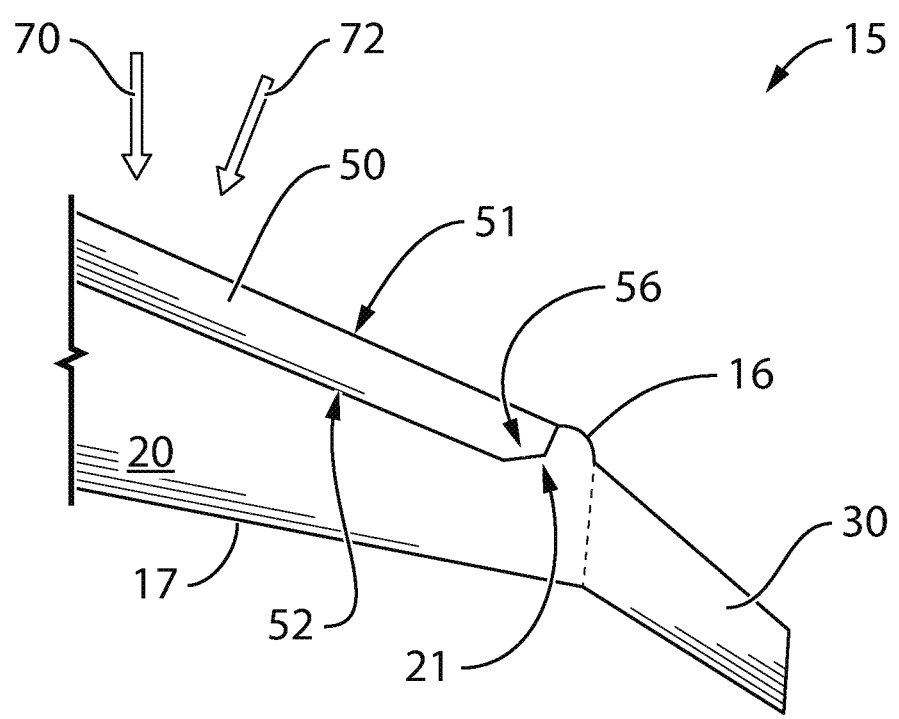
FIG. 4 is the top plan view of the outboard portion of FIG. 3, with the slat in a stowed position.
Figure 5:
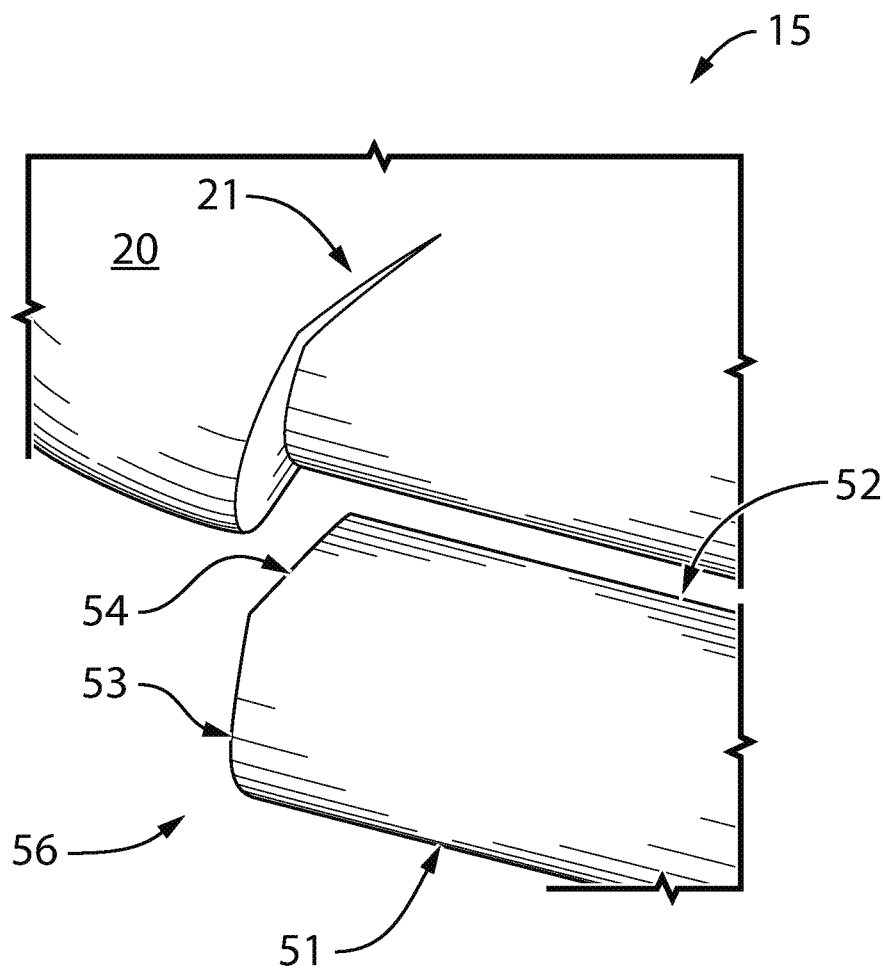
FIG. 5 is a top, front, and right side perspective view of a portion of the slat and the right wing of FIG. 3.
Figure 6:
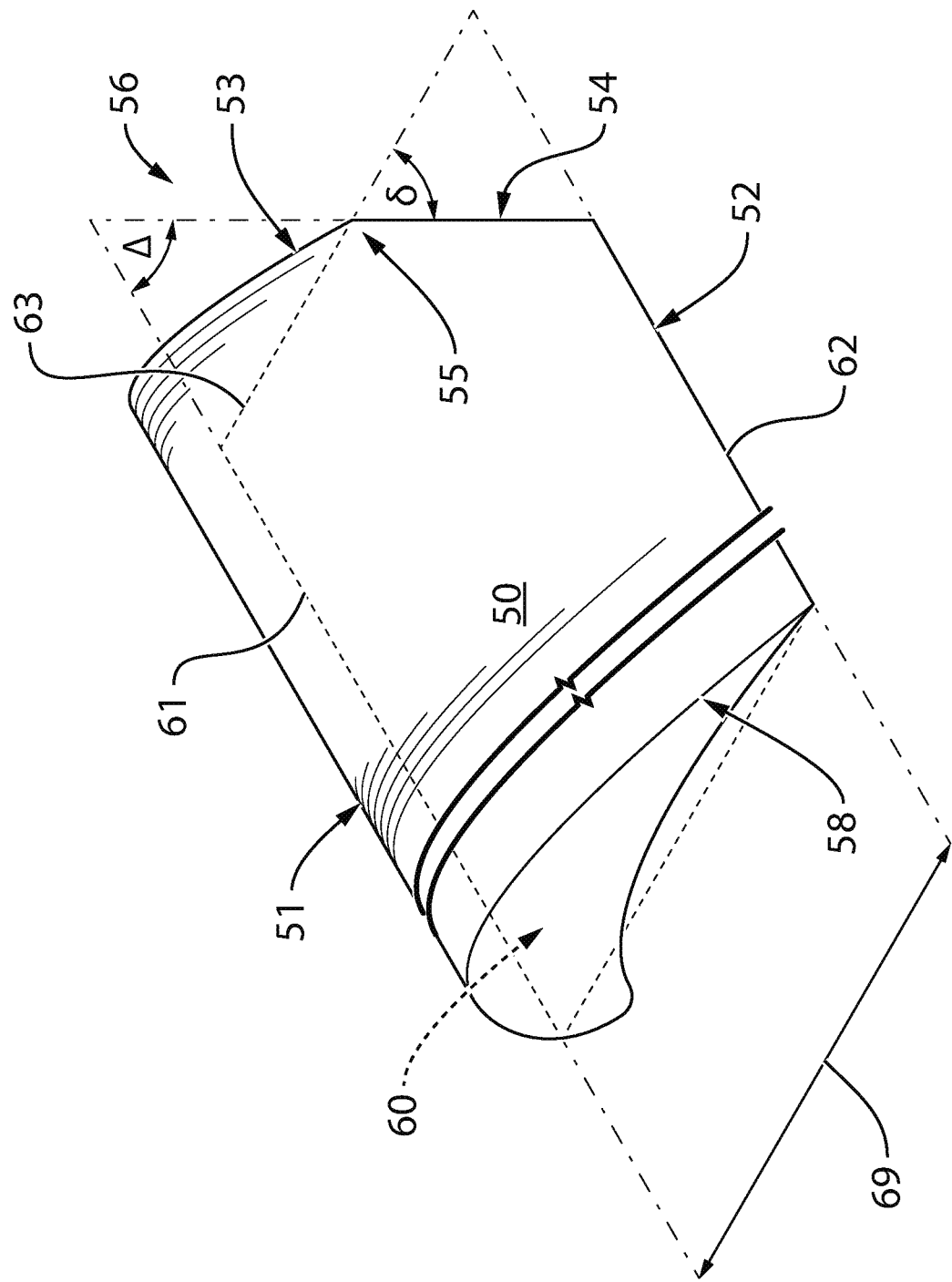
FIG. 6 is a top, rear, and left side perspective view of the slat of FIG. 3.

With reference to FIGS. 3 through 7, an outboard slat 50 according to the present technology is included on each wing 15, with each outboard slat 50 having an outboard edge 56 composed of a side portion 53 and a side portion 54 (FIG. 5). As best shown in FIG. 6, the side portion 54 is disposed at an angle δ to the side portion 53 and at an angle Δ to a leading edge 51, as will be described in more detail below and shown in FIG. 7.

Specifics of the outboard slats 50 will be described with respect to the right outboard slat 50 from the right wing 15 as shown in FIG. 3, the left outboard slat 50 from the left wing 15 being a mirror image of the right outboard slat 50.

The outboard slat 50 is disposed on an outboard portion of the wing 15, generally near the winglet 30, and is located on the leading edge 16 side of the wing 15. The wings 15 also have central and inboard slats 28, as seen in FIG. 1, which can be implemented according to known configurations. While the present technology will be described with wings 15 having only one outboard slat 50 per wing 15, it is contemplated that the central and inboard slats 28 could be replaced by the outboard slat 50 described herein. For example in some implementations, one or more outboard slats 50 could extend over the outer two thirds of the wing 15 or could cover the entire leading edge 16 of the wing 15.

As can be seen in FIGS. 3 to 5, the wing body 20 is also adapted to receive the outboard edge 56 of the outboard slat 50, with an edge 21 that conforms to the outboard edge 56. As such, when the outboard slat 50 is in a retracted position, the combination of outboard edge 56 of outboard slat 50 and edge 21 of the wing body 20 form a continuous surface broken only by the seam between the two.

Figure 7:
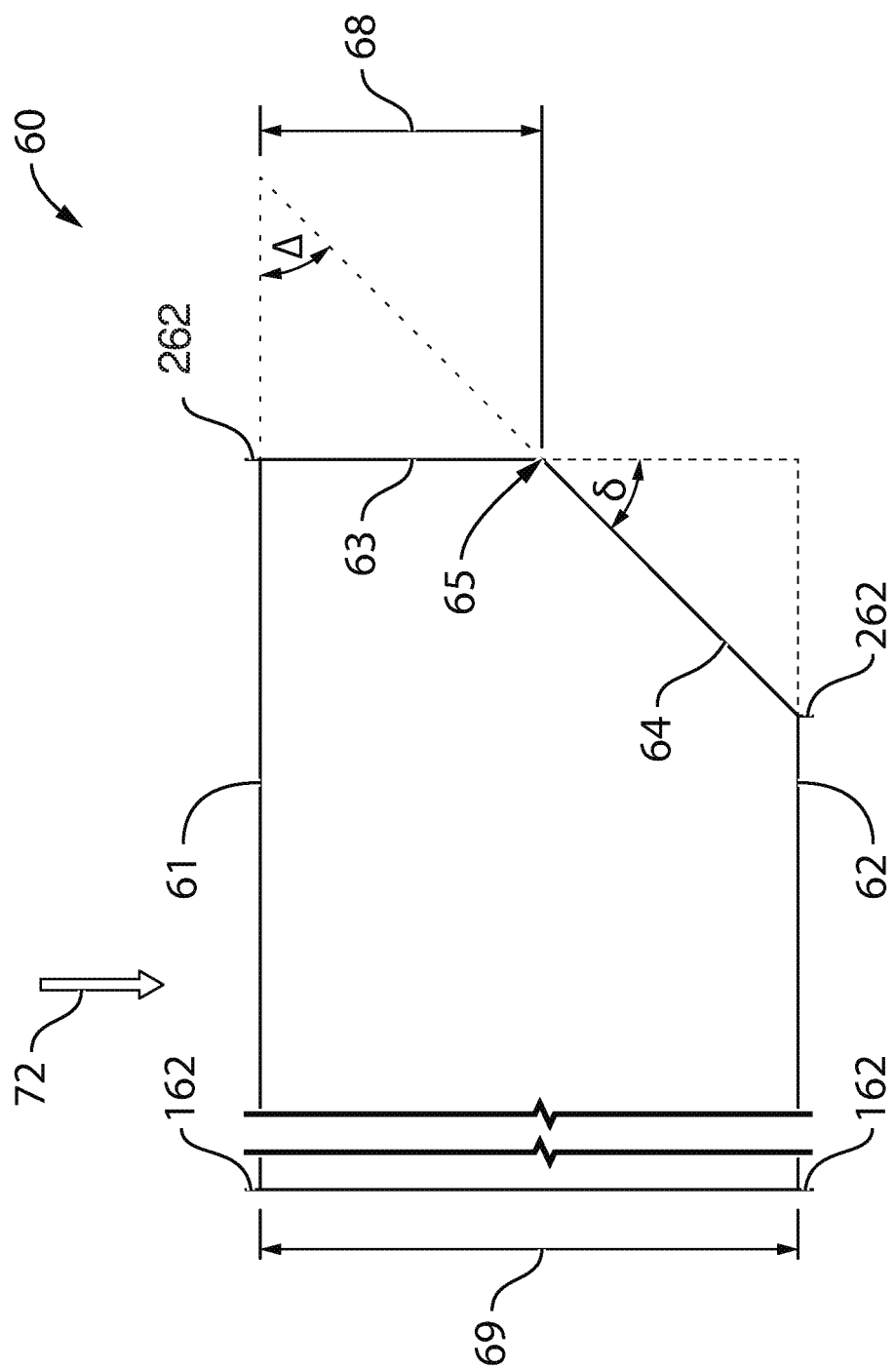
FIG. 7 is a plan view of a projection of the slat of FIG. 3.

With reference to FIGS. 6 and 7, the outboard slat 50 includes the leading edge 51 that defines a leading edge line 61 connecting forward-most points of the slat 50 (FIG. 6). The leading edge line 61 extends between an inboard end 162 and an outboard end 262. Opposite the leading edge 51, the slat 50 includes a trailing edge 52 defining a trailing edge line 62 connecting aft-most points of the slat 50. The trailing edge line 62 similarly extends between an inboard end 162 and an outboard end 262.

The leading edge line 61 and the trailing edge line 62 define a slat plane 60. It should be noted that the slat plane 60 is simply a geometric construct to aid in understanding the overall geometry of the slat 50. The trailing edge line 62 is disposed at a chord distance 69 from the leading edge line 61 in the hingewise direction 72, where the chord distance 69 extends normal to the leading edge line 61 and is measured along the slat plane 60. In some implementations, chord distance between the leading edge line 61 and the trailing edge line 62 could vary from inboard to outboard ends, and in such a case the chord distance 69 can be determined using the mean aerodynamic chord ("MAC"), described above.

On an inboard side of the outboard slat 50 is an inboard edge 58 extending substantially perpendicularly from the leading edge 51 to the trailing edge 52. Opposite the inboard edge 58 is an outboard edge 56, similarly extending from the leading edge 51 to the trailing edge 52. The outboard edge 56 includes the side portion 53 extending from the leading edge 51 to an intermediate point 55. The side portion 53 may be parallel to the inboard edge 58, although it is contemplated that this may not be the case for all implementations. The outboard edge 56 further includes the side portion 54 extending from the intermediate point 55 to the trailing edge 52.

As the outboard slat 50 has curved top and bottom surfaces, a further understanding of the overall shape of the outboard slat 50 can be gained by inspecting projections of the different sides of the slat 50 onto the slat plane 60, illustrated in FIG. 7. As described above, the slat plane 60 is defined by the leading edge line 61 and the trailing edge line 62.

A projection of the side portion 53 of the outboard edge 56 onto the slat plane 60 defines a side line 63, extending from the leading edge 61 to a projection 65 of the intermediate point 55. Similarly, a projection of the side portion 54 of the outboard edge 56 onto the slat plane 60 defines a side line 64, extending from the projected intermediate point 65 to the trailing edge line 62. The side line 64 is disposed at the angle δ to the side line 63, as the side portion 54 extends both toward the inboard edge 58 and the trailing edge 52 as it extends from the projected intermediate point 65. The side line 64 is also disposed at the angle Δ to the leading edge 51 and the leading edge line 61. The angle δ as shown in FIG. 7 is acute (i.e. less than 90 degrees) in relation to the side line 63. The angle Δ, also shown in FIG. 7, is acute in relation to the leading edge line 61. It is contemplated that the angles δ and Δ could vary from 20 degrees to 70 degrees. In implementations where the side line 63 is perpendicular to the leading edge line 61, such as is illustrated in FIG. 7, the angles δ and Δ are complementary angles. It is contemplated that in some implementations, the second angle is at least 45 degrees, while in other implementations the second angle could be less than 45 degrees, such that the side line 64 is less than 45 degrees from being aligned with the leading edge line 61.

As illustrated in FIG. 7, the side lines 63, 64 are straight lines, although it is contemplated that the projections 63, 64 of the side portions 53, 54 may take different forms. Further, the length of the side lines 63, 64 can vary in different implementations of the present technology. The side line 63 generally extends 90% or less of the length of the slat chord distance 69 along the outboard edge 56 from the leading edge line 61 to the intermediate point projection 65. In accordance with the present technology, the side line 63 extends from the leading edge line 61 to the intermediate point projection 65 at least 40% of the length of the slat chord distance 69 along the outboard edge 56. In some implementations, the side line 63 extends from the leading edge line 61 to the intermediate point projection 65 between 50% and 70% of the length of the slat chord distance 69 along the outboard edge 56.

The outboard slats 50, including the outboard edge 56 according to the present technology, aid in overcoming some disadvantages in using the large winglets 30 in combination with the prior art slat 150. Some of these disadvantages include non-linearities appearing in the lift coefficient and the pitching moment of the aircraft using the prior art slat 150 with the large winglets 30.

The lift coefficient "$C_L$" referred to herein is a coefficient of lift force generated by the wing assembly 15 having a particular shape of the wing body 20 and the winglet 30, at a particular angle of incidence ("α"). The angle of incidence α as defined herein refers to the angle α between the airflow direction 70 and a longitudinal axis of the aircraft 10, as viewed from a side of the aircraft 10. This is also referred to as the angle of attack. The pitching moment coefficient "$C_M$" referred to herein is a coefficient of torque (or "moment"), at a particular angle of incidence α, that acts on the wings 15 to pitch the aircraft 10 in a nose-up or a nose-down direction.

Figure 2:
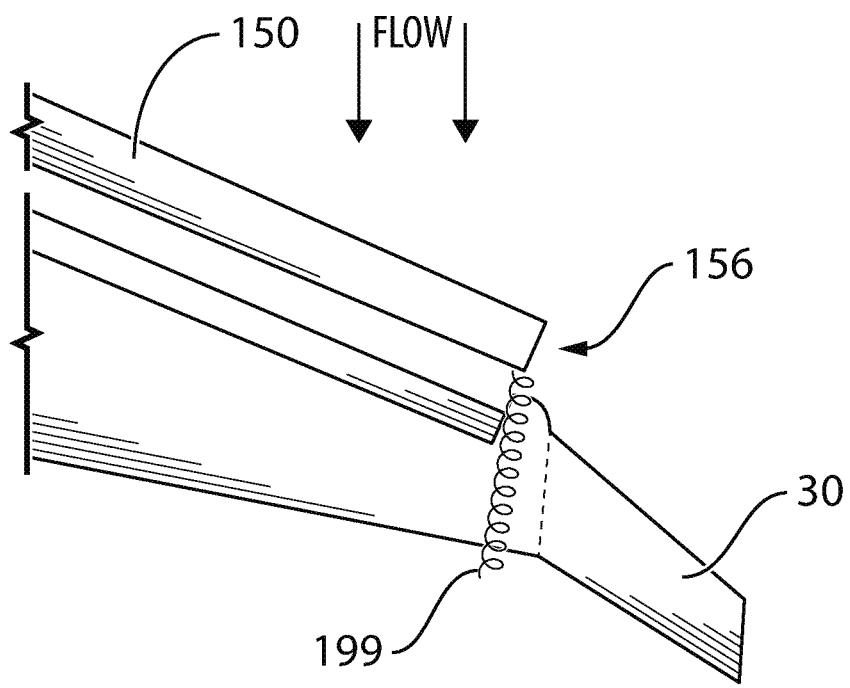
FIG. 2 is a top plan view of an outboard portion of a right wing assembly of an aircraft with a prior art slat in a deployed position.
Figure 8:
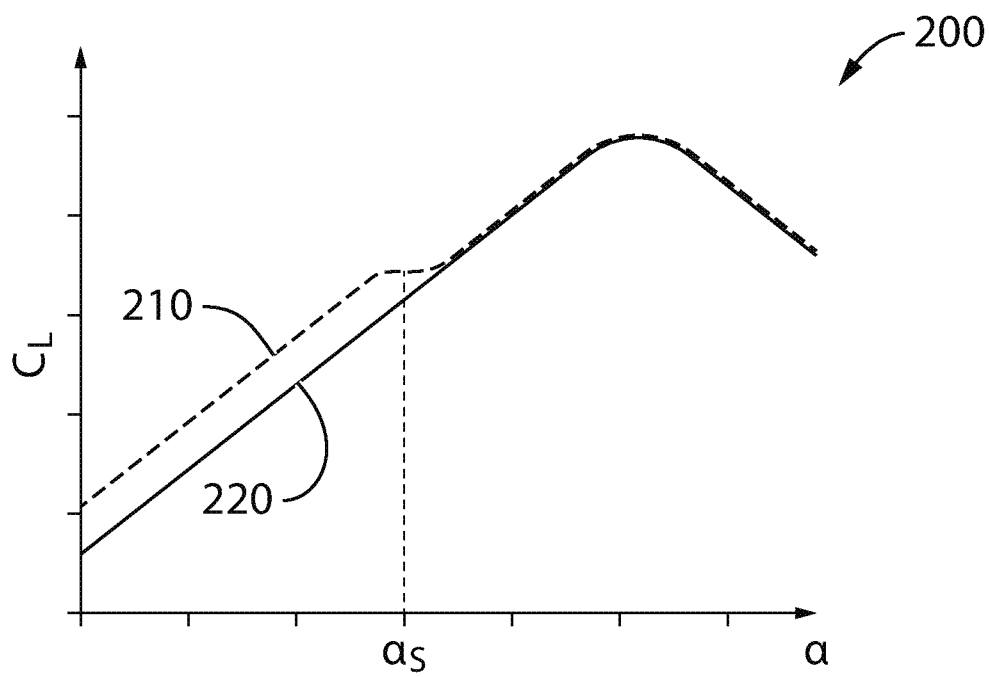
FIG. 8 is a graph illustrating a relationship between lift coefficient and an angle of incidence for the prior art slat of FIG. 2 and the slat of FIG. 3.
Figure 9:
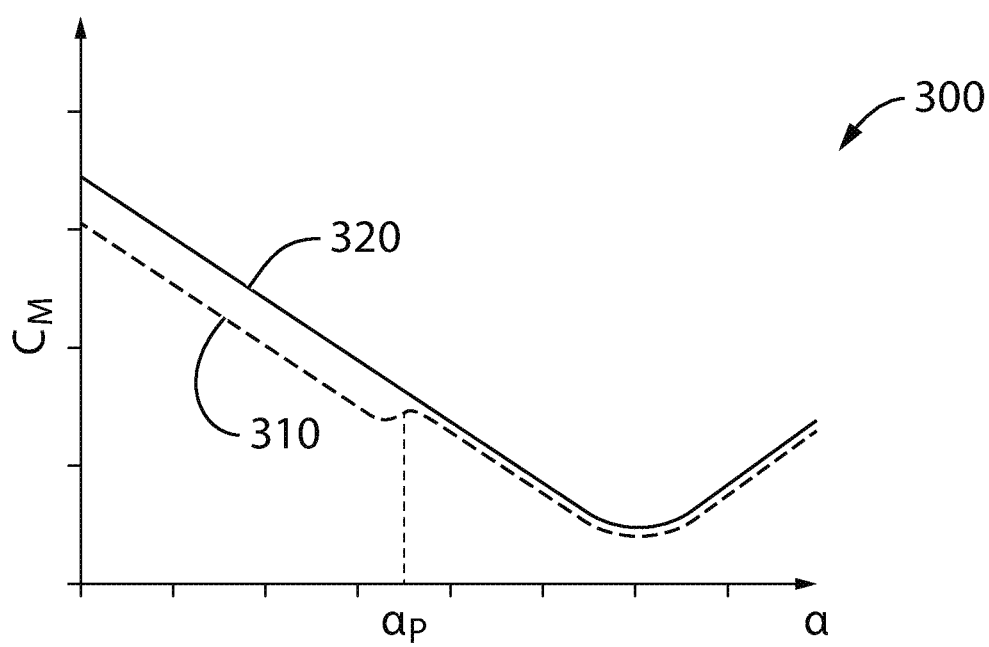
FIG. 9 is a graph illustrating a relationship between pitching moment and an angle of incidence for the prior art slat of FIG. 2 and the slat of FIG. 3.

As an example, the relationships between the lift coefficient $C_L$ and the pitching moment coefficient $C_M$ and the angle of attack α for a given size of the winglet 30 are illustrated in FIGS. 8 and 9. Graph 200 of FIG. 8 illustrates, for the given size of the winglet 30, the lift coefficient $C_L$ for the aircraft 10 employing the prior art slat 150 (broken line 210) and the slat 50 according to the present technology (solid line 220), the slats 50, 150 being in the deployed position. Similarly, graph 300 of FIG. 9 illustrates the pitching moment coefficient $C_M$ for the aircraft 10 employing the prior art slat 150 (broken line 310) and the slat 50 according to the present technology (solid line 320), the slats 50, 150 being in the deployed position. It should be noted that the specific angles and values of lift coefficient $C_L$ and pitching moment coefficient $C_M$ will depend on the exact shape of the wing 15, size and shape of the winglet 30, and numerous other factors. The graphs 200, 300 are simply one non-limiting example that will vary depending on details of specific implementations.

Where the prior art slat 150 is used, a vortex 199 is formed from the outboard edge of the slat 150, as is illustrated schematically in FIG. 2. The vortex 199 can interfere with a boundary layer of airflow around the wing 15, especially near the winglet 30. This interference can cause flow separation, which in turn is known to cause increased drag and undesirable pitch-up. For some larger winglets, this flow separation can occur suddenly at a given angle of attack, causing the lift coefficient $C_L$ and the pitch moment coefficient $C_M$ to change non-linearly with respect to the angle of attack α. Instead of increasing linearly with angle of attack, as is generally the most desirable, for some angles α the lift and pitching moment will not follow the expected linear relationship. In the graph 200, for example, it can be seen that the aircraft employing the slat 150 has a sudden drop in the lift coefficient at the angle $α_S$, such that as the angle of attack α increases, there is a sudden drop in the lift coefficient as the angle of attack α approaches $α_S$. Similarly, in the graph 300 it can be seen that the aircraft employing the slat 150 has a sudden jump in the pitching moment coefficient at the angle $α_P$, such that as the angle of attack α increases, there is a sudden increase in the pitching moment coefficient as the angle of attack α approaches $α_P$, where the aircraft may experience an undesirable pitch-up. As described above, the solution to these undesirable non-linearities due to larger winglets would have previously resided in increasing the complexity of the operational rules for the aircraft to compensate for the non-linearities of the functions, implementing expensive physical changes to the design of the aircraft, or simply to limit the winglet size to one that avoids the above described inconveniences.

Where the slat 50 according to the present technology is used, a vortex 99 is similarly formed from the outboard edge 56 of the slat 150, as is illustrated schematically in FIG. 3. The vortex 99 created by the slat 50 is shifted inboard compared to the vortex 199 from the slat 150 (the location of the vortex 199 illustrated for comparison in FIG. 3 in a dash-dot line).

The vortex 99 will also interfere with the boundary layer of airflow around the wing 15, but situating the vortex 99 further inboard away from the winglet 30, as compared to the vortex 199, generally has two effects. First, moving the vortex 99 to the inboard direction causes a more gradual, although earlier, interference with boundary layer. As can be seen in graph 200 of FIG. 8, the lift coefficient $C_L$ is slightly reduced for a portion of the angles of attack α (line 220) for the slat 50 over the prior art slat 150 (line 210), as the vortex 99 will have a slightly increased interference with the boundary layer. As the interference is more gradual, however, the lift coefficient $C_L$ increases linearly with the angle of attack α, avoiding the sudden flow separation at the angle $α_S$.

Second, moving the vortex 99 in the inboard direction similarly means that there is no sudden flow separation at the wing tip near the winglet 30. Use of the slat 50 according to the present technology thus aids in avoiding the undesirable pitch-up at angle $α_P$. As can be seen in graph 300 of FIG. 9. However, it should be noted that the overall pitching moment coefficient $C_M$ may be slightly increased with the use of the slat 50 (line 320) for at least a portion of the angles of attack α over the use of the prior art slat 150 (line 310).

The implementations of the present technology do not require any independent movable system and as such reduce the aircraft's weight, complexity and maintenance needs compared to other systems or structural modifications that may achieve similar increases in performance. The advantages related to utilizing the implementations of the present technology have been validated both theoretically and experimentally. A slat having the features according to the implementations of the present technology was tested on a wind tunnel model at high Reynolds numbers.

The slat 50, the wing assembly 15, and the airplane 10 implemented in accordance with some non-limiting implementations of the present technology can be represented as presented in the following numbered clauses.

CLAUSE 1: A slat (50) for an aircraft wing (15), comprising: a leading edge (51) defining a leading edge line (61) connecting forward-most points of the slat (50) and extending between an inboard end (162) and an outboard end (262); a trailing edge (52) defining a trailing edge line (62) connecting aft-most points of the slat (50), extending between the inboard end (162) and the outboard end (262), and being disposed a chord distance (69) from the leading edge (51) in a hingewise direction (72), the leading edge line (61) and the trailing edge line (62) defining a slat plane (60), the chord distance (69) between the leading edge (51) and the trailing edge (52) extending normal to the leading edge (51), the chord distance (69) being measured along the slat plane (60); an inboard edge (58) extending from the leading edge (51) to the trailing edge (52); and an outboard edge (56) extending from the leading edge (51) to the trailing edge (52), the outboard edge (56) comprising: a first side portion (53) extending from the leading edge (51) to an intermediate point (55) between the leading edge (51) and the trailing edge (52), a projection of the first side portion (53) onto the slat plane (60) defining a first side line (63), and a second side portion (54) extending from the intermediate point (55) to the trailing edge (52), a projection of the second side portion (54) onto the slat plane (60) defining a second side line (64), the second side line (64) being disposed at a first angle (δ) to the first side line (63) and at a second angle (A) to the leading edge line (61), the second side line (64) extending toward the inboard edge (58) as it extends toward the trailing edge (52).

CLAUSE 2: The slat (50) according to clause 1, wherein the first side line (63) is a straight line.

CLAUSE 3: The slat (50) according to clause 1 or 2, wherein the second side line (64) is a straight line.

CLAUSE 4: The slat (50) according to any one of clauses 1 to 3, wherein the first side line (63) extends for 60% or less of the chord distance (69).

CLAUSE 5: The slat (50) according to any one of clauses 1 to 4, wherein the first side line (63) extends for at least 40% of the chord distance (69).

CLAUSE 6: The slat (50) according to any one of clauses 1 to 5, wherein: the first side line (63) is perpendicular to the leading edge line (61); and the first angle (δ) and the second angle (Δ) are complementary angles.

CLAUSE 7: The slat (50) according to any one of clauses 1 to 6, wherein the second angle (Δ) is at least 45 degrees.

CLAUSE 8: The slat (50) according to any one of clauses 1 to 7, wherein the second angle (Δ) is less than 45 degrees.

CLAUSE 9: The slat (50) according to any one of clauses 1 to 8, wherein a projection of the inboard edge (58) onto the slat plane (60) is parallel to the line extending normal to the leading edge (51).

CLAUSE 10: The slat (50) according to any one of clauses 1 to 9, wherein the slat (50) is an outboard-most slat (50) of the aircraft wing (15).

CLAUSE 11: The slat (50) according to clause 1, wherein the first side portion (53) and the second side portion (54) of the outboard edge (56) provide at least one of a lift coefficient $C_L$ and a pitch moment coefficient $C_M$ that change with respect to an angle of attack (α) of the aircraft (10).

CLAUSE 12: A wing assembly (15) comprising: a wing body (20); a winglet (30) connected to a tip of the wing body (20); and a slat (50) movably connected to the wing body (20), the slat (50) comprising: a leading edge (51) defining a leading edge line (61) connecting forward-most points of the slat (50) and extending between an inboard end (162) and an outboard end (262); a trailing edge (52) defining a trailing edge line (62) connecting aft-most points of the slat (50), extending between the inboard end (162) and the outboard end (262), and being disposed a chord distance (69) from the leading edge (51) in a hingewise direction (72), the leading edge line (61) and the trailing edge line (62) defining a slat plane (60), the chord distance (69) between the leading edge (51) and the trailing edge (52) extending normal to the leading edge (51), the chord distance (69) being measured along the slat plane (60); an inboard edge (58) extending from the leading edge (51) to the trailing edge (52); and an outboard edge (56) extending from the leading edge (51) to the trailing edge (52), the outboard edge (56) comprising: a first side portion (53) extending from the leading edge (51) to an intermediate point (55) between the leading edge (51) and the trailing edge (52), a projection of the first side portion (53) onto the slat plane (60) defining a first side line (63), and a second side portion (54) extending from the intermediate point (55) to the trailing edge (52), a projection of the second side portion (54) onto the slat plane (60) defining a second side line (64), the second side line (64) being disposed at a first angle (δ) to the first side line (63) and at a second angle (Δ) to the leading edge line (61), the second side line (64) extending toward the inboard edge (58) as it extends toward the trailing edge (52).

CLAUSE 13: The wing assembly (15) according to clause 12, wherein the first side line (63) is a straight line.

CLAUSE 14: The wing assembly (15) according to clause 12 or 13, wherein the second side line (64) is a straight line.

CLAUSE 15: The wing assembly (15) according to any one of clauses 12 to 14, wherein the first side line (63) extends for 60% or less of the chord distance (69).

CLAUSE 16: The wing assembly (15) according to any one of clauses 12 to 15, wherein the first side line (63) extends for at least 40% of the chord distance (69).

CLAUSE 17: The wing assembly (15) according to any one of clauses 12 to 16, wherein: the first side line (63) is perpendicular to the leading edge line (61); and the first angle (δ) and the second angle (Δ) are complementary angles.

CLAUSE 18: The wing assembly (15) according to any one of clauses 12 to 17, wherein the second angle (Δ) is at least 45 degrees.

CLAUSE 19: The wing assembly (15) according to any one of clauses 12 to 18, wherein the second angle (Δ) is less than 45 degrees.

CLAUSE 20: The wing assembly (15) according to any one of clauses 12 to 19, wherein a projection of the inboard edge (58) onto the slat plane (60) is parallel to the line extending normal to the leading edge (51).

CLAUSE 21: The wing assembly (15) according to any one of clauses 12 to 20, wherein, when the wing assembly (15) is connected to an airplane (10), a slat vortex (99) created by air flowing over the outboard edge (56) of the slat (50) is directed toward an inboard side of the wing assembly (15).

CLAUSE 22: An airplane (10) comprising: a fuselage (12); and two oppositely disposed wing assemblies (15), according to any one clauses 12 to 21, connected to the fuselage (12).

The specification is not intended to limit the aspects of implementations of the present technology as recited in the claims below. Modifications and improvements to the above-described implementations of the present technology may become apparent to those skilled in the art. The foregoing description is intended to be exemplary rather than limiting.

What is claimed is:

1. A slat for an aircraft wing, comprising:
    a leading edge defining a leading edge line connecting forward-most points of the slat and extending between an inboard end and an outboard end;
    a trailing edge defining a trailing edge line connecting aft-most points of the slat, extending between the inboard end and the outboard end, and being disposed a chord distance from the leading edge in a hingewise direction,
    the leading edge line and the trailing edge line defining a slat plane, the chord distance between the leading edge and the trailing edge extending normal to the leading edge, the chord distance being measured along the slat plane;
    an inboard edge extending from the leading edge to the trailing edge; and
    an outboard edge extending from the leading edge to the trailing edge, the outboard edge comprising:
        a first side portion extending from the leading edge to an intermediate point between the leading edge and the trailing edge, a projection of the first side portion onto the slat plane defining a first side line, and
        a second side portion extending from the intermediate point to the trailing edge, a projection of the second side portion onto the slat plane defining a second side line,
        the second side line being disposed at a first angle to the first side line and at a second angle to the leading edge line, the second side line extending toward the inboard edge as it extends toward the trailing edge,
    a slat vortex created by air flowing over the outboard edge of the slat being directed toward an inboard side of the wing when the wing is connected to an airplane.

2. The slat according to claim 1, wherein the first side line is a straight line.

3. The slat according to claim 1, wherein the second side line is a straight line.

4. The slat according to claim 1, wherein the first side line extends for 60% or less of the chord distance.

5. The slat according to claim 1, wherein the first side line extends for at least 40% of the chord distance.

6. The slat according to claim 1, wherein:
    the first side line is perpendicular to the leading edge line; and
    the first angle and the second angle are complementary angles.

7. The slat according to claim 1, wherein the second angle is at least 45 degrees.

8. The slat according to claim 1, wherein the second angle is less than 45 degrees.

9. The slat according to claim 1, wherein a projection of the inboard edge onto the slat plane is parallel to the line extending normal to the leading edge.

10. The slat according to claim 1, wherein the slat is an outboard-most slat of the aircraft wing.

11. The slat according to claim 1, wherein the first side portion and the second side portion of the outboard edge provide at least one of a lift coefficient $C_L$ and a pitch moment coefficient $C_M$ that change with respect to an angle of attack of the aircraft.

12. A wing assembly comprising:
    a wing body;
    a winglet connected to a tip of the wing body; and
    a slat movably connected to the wing body, the slat comprising:

a leading edge defining a leading edge line connecting forward-most points of the slat and extending between an inboard end and an outboard end;

a trailing edge defining a trailing edge line connecting aft-most points of the slat, extending between the inboard end and the outboard end, and being disposed a chord distance from the leading edge in a hingewise direction, the leading edge line and the trailing edge line defining a slat plane, the chord distance between the leading edge and the trailing edge extending normal to the leading edge, the chord distance being measured along the slat plane;

an inboard edge extending from the leading edge to the trailing edge; and an outboard edge extending from the leading edge to the trailing edge, the outboard edge comprising:
- a first side portion extending from the leading edge to an intermediate point between the leading edge and the trailing edge, a projection of the first side portion onto the slat plane defining a first side line, and
- a second side portion extending from the intermediate point to the trailing edge, a projection of the second side portion onto the slat plane defining a second side line, the second side line being disposed at a first angle to the first side line and at a second angle to the leading edge line, the second side line extending toward the inboard edge as it extends toward the trailing edge, a slat vortex created by air flowing over the outboard edge of the slat being directed toward an inboard side of the wing assembly when the wing assembly is connected to an airplane.

13. The wing assembly according to claim 12, wherein the first side line is a straight line.

14. The wing assembly according to claim 12, wherein the second side line is a straight line.

15. The wing assembly according to claim 12, wherein the first side line extends for 60% or less of the chord distance.

16. The wing assembly according to claim 12, wherein the first side line extends for at least 40% of the chord distance.

17. The wing assembly according to claim 12, wherein:
the first side line is perpendicular to the leading edge line; and
the first angle and the second angle are complementary angles.

18. The wing assembly according to claim 12, wherein the second angle is at least 45 degrees.

19. The wing assembly according to claim 12, wherein the second angle is less than 45 degrees.

20. The wing assembly according to claim 12, wherein a projection of the inboard edge onto the slat plane is parallel to the line extending normal to the leading edge.

21. An airplane comprising:
a fuselage; and
two oppositely disposed wing assemblies, according to claim 12, connected to the fuselage.

* * * * *